United States Patent
van Heyningen

(10) Patent No.: US 7,248,540 B1
(45) Date of Patent: Jul. 24, 2007

(54) DUAL CHANNEL DELAY SENSING CIRCUIT

(75) Inventor: Arent H. Kits van Heyningen, Newport, RI (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 05/944,530

(22) Filed: Sep. 11, 1978

(51) Int. Cl.
*G01S 3/80* (2006.01)
(52) U.S. Cl. .................................. 367/125
(58) Field of Classification Search .......... 340/16 P; 324/83 D, 186, 188, 88 D; 328/133; 343/114, 343/114.5; 367/125
See application file for complete search history.

(56) References Cited

U.S. PATENT DOCUMENTS

| | | | | |
|---|---|---|---|---|
| 3,579,104 A | * | 5/1971 | Pignard et al. | 324/83 D |
| 3,588,710 A | * | 6/1971 | Masters | 328/133 |
| 3,763,465 A | * | 10/1973 | Tatge et al. | 340/16 R |
| 3,922,634 A | * | 11/1975 | Warner | 340/6 R |

* cited by examiner

*Primary Examiner*—Daniel Pihulic
(74) *Attorney, Agent, or Firm*—Daly, Crowley, Mofford & Durkee, LLP

(57) ABSTRACT

A circuit coupled to an array antenna, such as a sonar transducer array, for measuring the angle of orientation of an incident wave of radiation is formed of first and second channels coupled to respective portions of the antenna to sense delays between signals of the two channels. A memory retains data of earlier occurring lead and lag measurements. Any subsequent transition from a lead/lag to a lag/lead within a single signal pulse is sensed by a gating circuit which disgards the measurement so as to provide noise immunity.

3 Claims, 2 Drawing Sheets

US 7,248,540 B1

DUAL CHANNEL DELAY SENSING CIRCUIT

BACKGROUND OF THE INVENTION

The invention relates to a differential delay measurement circuit, and more particularly, to a delay measurement circuit suitable for use in a bearing deviation indicator for sensing the delay between portions of a sonar transducer array to provide a measure of the angle of orientation of an incident sound wave relative to the transducer array.

Bearing deviation indicators have been utilized in sonar applications for measuring the angle of orientation of a beam of sound relative to an array of transducers. Bearing deviation indicators typically comprise a differential delay circuit having two input channels for receiving signals from each half of an array of sonar transducers. The delay sensed between signals of the two channels is readily converted to the direction of the incident sonar beam. Such differential delay circuits are utilized in other applications besides sonar, and may be utilized, for example, for measuring the differential delay between two signals in a radar system. However, to facilitate a description of the invention, the differential delay circuit will be described with reference to its use in a bearing deviation indicator for sonar application.

A delay measurement circuit used in bearing deviation indicators is responsive to the leading and/or trailing edges of signal pulses in each of the two channels. Typically, the pulse type signals in each of the channels are produced by limiters or clipping amplifiers coupled between the sonar transducers and the delay measuring circuit.

A problem arises in the use of a bearing deviation indicator with sonar receivers having bandwidths in excess of approximately two octaves, and wherein the ratio of signal power to noise power (SNR) is less than approximately 5 dB. The problem is manifested by jitter which may be present in the leading and trailing edges of the signal pulses. The jitter is present when the centroid of the power spectrum of the signal is at a lower frequency than the centroid of the noise spectrum. Exemplary situations are that of a monotone sonar signal at a frequency in the lower portion of the receiver passband or a sonar signal having the major portion of its power falling within the spectral region at the lower portion of the receiver passband while the noise power uniformly fills the receiver passband.

In the foregoing situations, even a small difference in the amounts of receiver noise between the two channels of the bearing deviation indicator produces a bias error in the delay measurement. An apparent angular offset of the incident sonar beam is thereby registered even when the beam axis coincides with the array axis. Due to the jitter, the average number of axis crossings of the signal in one channel differs from that of the signal in the other channel, the difference being dependent on the relative magnitudes of the SNR in one channel as compared to the SNR in the other channel.

SUMMARY OF THE INVENTION

The aforementioned problem is overcome and other advantages are provided by a delay circuit for measuring the difference in delay between the signals of two signal channels. The delay circuit comprises, in accordance with the invention, a memory for recording the temporal relationship between a leading edge of the first channel signal and the leading edge of the second channel signal. In response to the occurrences of the leading edges of the signals of the first and second channels, a time measurement circuit which may include a counter measures the elapsed time between the leading edges. A gating circuit responsive to the temporal relationship between the corresponding trailing edges of the signals of the first and second channels reads out data from the time measurement circuit when the temporal relationship of the trailing edges conforms to the temporal relationship of the leading edges as recorded in the memory. For example, when the temporal relationship of the leading edges is such that the signal of the first channel leads the signal of the second channel, then data of the time measuring circuit will be read out when the temporal relationship of the trailing edges also provides for the signal of the first channel leading the signal of the second channel. However, in the event that the presence of noise were to distort one or both of the signals of the first and second channels such that, with reference to the foregoing example, the relationship of the trailing edges would be found to be such that the signal of the first channel were lagging the signal of the second channel, then no data would be read out of the time measurement circuit. In this way, measurements which have been made in the presence of excessive signal distortion induced by the noise are discarded. As a consequence, the foregoing circuit has been found to eliminate the aforementioned bias error. The elimination of the bias error reduces the variance of a measurement in a bearing deviation indicator and improves its sensitivity.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
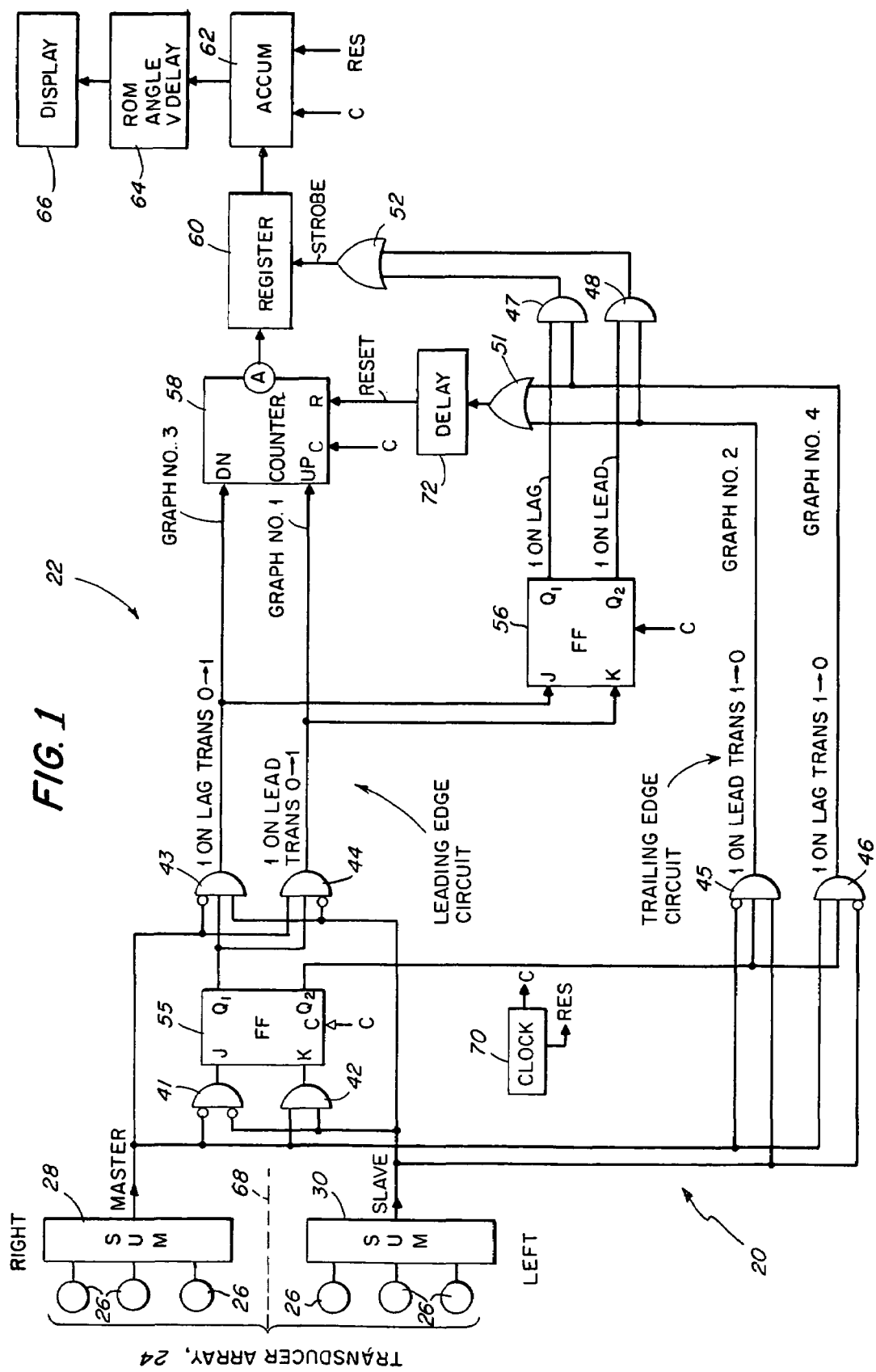
FIG. 1 is a block diagram of the differential delay measurement circuit of the invention.
Figure 2:
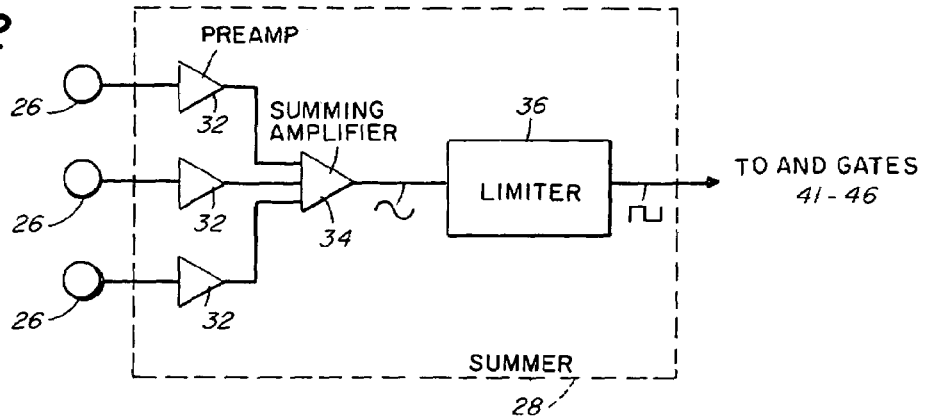
FIG. 2 is a block diagram of a summer of FIG. 1 showing preamplifiers and a limiter for receiving signals from transducers of one-half of the transducer array of FIG. 1.

Referring now to FIGS. 1 and 2, there is seen a bearing deviation indicator 20 incorporating a differential delay measurement circuit 22 in accordance with the invention. An array 24 of sonar transducers 26 is provided for receiving a sound wave incident upon the array 24. The transducers 26 of the right portion of the array 24 are coupled together by a summer 28 to produce the signal of the master channel of the measurement circuit 22. The transducers 26 of the left portion of the array 24 are coupled together by a summer 30 to produce the signal of the slave channel of the measurement circuit 22.

The summers 28 and 30 each comprise the same elements, these elements being depicted in FIG. 2 for the summer 28. The summer 28 is seen to comprise a set of preamplifiers 32, a summing amplifier 34, and a limiter 36. The preamplifiers 32 are provided with a pass band equal to the bandwidth of the sonar signals carried by the sound wave incident upon the transducers 26. The amplified signals provided by each of the preamplifiers 32 are then summed together by the summing amplifier 34 to produce a sum signal which has a sinusoidal waveform in the case of a high signal noise ratio while, in the case of a relatively low signal to noise ratio, the signal at the output of the amplifier 34 has a generally sinusoidal waveform. The sinusoidal waveform of the amplifier 34 is then clipped by the limiter 36 to produce a substantially square waveform which has substantially uniform periodicity in the case of high signal-to-noise ratio while, in the case of relatively low signal-to-noise ratio, the leading and trailing edge of the square waveform of the limiter 36 have jitter with a resulting distortion of the successive cycles of the waveform.

As seen in FIG. 1, the measurement circuit 22 includes eight AND gates 41-48, two OR gates 51-52, two J-K flip flops 55-56, an up/down counter 58, a register 60, an accumulator 62, a read-only memory 64, and a display 66 for displaying the bearing angle of the axis of the sound wave incident upon the array 24 relative to the axis 68 of the array 24.

The upper portion of the measurement circuit 22 is identified in the figure as the leading edge circuit while the lower portion of the measurement circuit 22 is identified in the figure as the trailing edge circuit. The leading edge circuit comprising the AND gates 43-44 provides data as to the lead/lag temporal relationship of the leading edges of the signals of the master and slave channels. The trailing edge circuit comprising the AND gates 45-46 provides data on the lead/lag temporal relationship of the trailing edges of the signals of the master and slave channels. FIG. 1 shows specific input terminals of the AND gates 41 and 43-46 which are complemented as is indicated by the little circles shown at the input terminals. The flip flops 55-56, the counter 58 and the accumulator 62 are driven by clock pulses from terminal C of a clock 70, the clock pulses of the clock 70 being provided at a rate which is much faster, for example, one hundred times faster than the frequency of the signals of the master and slave channels. The high clock rate is utilized for discerning small increments of delay between the signals of the master and slave channels. As is well known, J-K flip flops such as the flip flops 55-56 provide at their output terminals Q1 and Q2, upon activation by the clock pulses at terminal C, signals which are equal respectively to the signals at the input terminals J and K when the input signals are of opposite logic states. For example, such opposite logic states are J=1 corresponding to a relatively high voltage at the output of the AND gate 41 and K=0 corresponding to a relatively low voltage at the output terminal of the AND gate 42, or J=0 and K=1. Under conditions when J=0 and K=0, the output terminals Q1 and Q2 retain their previous values in which case the flip flops 55-56 act as memories for storing the previous values of the signals at the Q1 and Q2 terminals.

As will be seen in the ensuing description of the operation of the measurement circuit 22, the leading edge circuit provides signals which trigger the counter 58 to count up or down depending on the temporal relationship between the leading edges of the master and slave signals. Similarly, it will be seen that the trailing edge circuit provides data as to the trailing edges of the master and slave signals, the AND gates 44 and 45 having logic states of 1 when the master signal leads the slave signal while the AND gates 43 and 46 have logic states of 1 when the master signal lags the slave signal.

Figure 3:
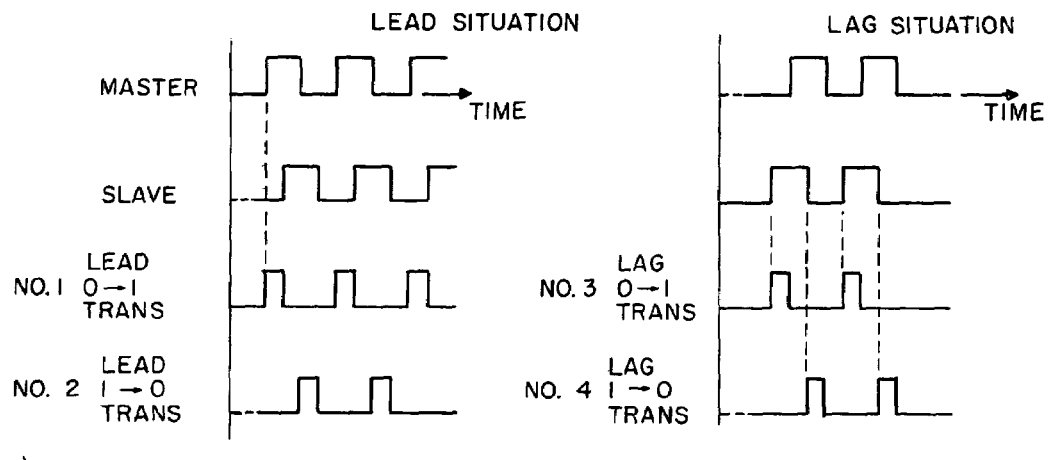
FIG. 3 shows a set of graphs depicting lead and lag relationships between the signals of a first channel and a second channel of FIG. 1.

With reference also to FIG. 3, the master and slave signals are depicted as square waves wherein, in the graphs of the lead situations, the master signal is depicted as leading the slave signal, while in the graph depicting the lag situations, the master signal is depicted as lagging the slave signal. In particular, it is noted that the master and slave signals each have logic states of 0 or 1 to provide a total of four possible combinations of logic states which are presented to the AND gates 41-42. Graph #1 depicts the signal produced by the AND gate 44 whereby the leading edge circuit signifies that the master signal is leading the slave signal. Graph #2 depicts the signal produced by the AND gate 45 whereby the trailing edge circuit signifies that the master signal is leading the slave signal. Graph #3 depicts the signal produced by the AND gate 43 whereby the leading edge circuit signifies that the master signal is lagging the slave signal. Graph #4 depicts the signal produced by the AND gate 46 whereby the trailing edge circuit signifies that the master signal is lagging the slave signal. The signals depicted in graphs #1 and #3 are initiated upon the 0-1 transitions in logic levels of the leading edges, respectively in the master signal of graph #1 and in the slave signal of graph #3. The signals depicted by the graphs #2 and #4 are initiated upon the 1-0 transitions in logic levels of the trailing edges, respectively, in the signal of graph #2 and in the slave signal of graph #4.

In operation, therefore, the AND gate 41 produces a logic 1 at its output terminal when both the master and slave inputs are 0, the logic 1 being applied to terminal J. If either one or both of the inputs to the AND gate 41 are at a logic 1, the output signal of the AND gate 41 is a logic 0. In an analogous fashion, the AND gate 42 provides a logic 1 to terminal K when both of the inputs to the AND gate 42 are at logic 1, the AND gate 42 providing a logic 0 to terminal K when either one or both of the inputs to the AND gates 42 are 0. Thus, it is seen that when the master and slave signals have equal logic states, the logic states of terminals J and K are unequal with the result that the logic states of terminals J and K are applied to the terminals Q1 and Q2 with each appearance of the clock pulse at terminal C of the flip flop 55. When the logic states of the master and slave signals differ, then J=0 and K=0 with the result that the flip flop 55 is in a storage mode so that the terminals Q1 and Q2 retain their previous logic states independently of the appearance of the clock pulses at terminal C.

When both the master and slave signals have logic states of 0, the Q1 terminal of the flip flop 55 provides a logic 1 to the center input terminals of the AND gates 43-44 while the terminal Q2 provides a logic state of 0 to the center input terminals of the AND gates 45-46. When the master and slave signals are both at logic 1, the center input terminals of the AND gates 43-44 are at logic 0 while the center input terminals of the AND gates 45-46 are at logic 1. Upon the next transition in logic state of either the master signal or the slave signal, the flip flop 55 is placed in its storage mode so that the center input terminals of the AND gates 43-46 remain unchanged. Thereupon, a waveform appears at the output of one of the AND gates 43-46 in accordance with the teaching of the graphs of FIG. 3. Thus, in the event that the foregoing transition represented a lead situation, the waveform of graph #1 would appear at the output terminal of the AND gate 44 to be followed subsequently by the waveform of graph #2 which would appear at the output terminal of the AND gate 45. In the event that the preceding transition were a lag situation, then the waveform of graph #3 would appear at the output terminal of the AND gate 43 to be followed subsequently by the waveform of the graph #4 which would appear at the output terminal of the AND gate 46. It is noted that the preceding description of the four waveforms recited that either the waveforms of the lead situation would apply or the waveforms of the lag situation would apply. Such is the case when there is a high signal-to-noise ratio for the master and slave signals. In the case of a low signal-to-noise ratio for the master and slave signals, the foregoing statement may not always apply and, indeed, under the influence of the noise, the master signal or slave signal may be so distorted that a lead situation for the leading edge, as will be described with reference to FIG. 5, may be followed by a lag situation for the trailing edge.

The flip flop 56 is utilized for determining the presence of the foregoing noise. As can be seen from the graphs of FIG. 3, either the waveform of graph #1 or the waveform of graph #3 applies to the temporal relationship of the leading edges of the master and slave signals. Therefore, upon the occurrence of the leading edge of the master or slave signal, the J and K terminals of the flip flop 56 are of different logic states with the result that their logic states are communicated to the Q1 and Q2 terminals upon the presence of a clock pulse at terminal C. At the conclusion of the leading edge transition of the waveform of graph #1 or of graph #3, logic states of 0 appear at both terminals J and K thereby placing the flip flop 56 in its storage mode. Upon the occurrence of the temporal relationship of the trailing edges of the master and slave signals, as signified by the logic states at the output terminals of the AND gates 45 and 46, the flip flop 56 is still storing the temporal relationship of the leading edges. Thus, the logic states at the terminals Q1 and Q2 of the flip flop 56 and the logic states at the output terminals of the AND gates 45 and 46 determine whether or not the master and slave signals have been distorted by noise. In this connection it is noted that either terminal Q1 or Q2 of the flip flop 56 shows a logic 1 depending on whether the leading edge temporal relationship is respectively a lag or lead. Also, the output terminals of the AND gates 45 or 46 show a logic 1 to indicate a temporal relationship of the trailing edges which is respectively a lead or lag.

In the event that the lag indication at the output terminals of the flip flop 56 agrees with the lag indication of the trailing edge circuit, or in the event that the lead indication of the flip flop 56 agrees with the lead indication of the trailing edge circuit, then data is read from the counter 58 to the register 60. In the event that there is disagreement in the lead/lag indication of the flip flop 56 and the lead/lag indication of the trailing edge circuit, as will be described in FIG. 5 for a distortion of the master and/or slave signals, then no data is coupled from the counter 58 to the register 60. In this way, the register 60 is provided with data only in those situations wherein the influence of noise on any one pulse of the master or slave signals has not been excessive. The data of delays between the master and slave signals is obtained only from pairs or pulses of the master and slave signals which have not been excessively distorted by the noise. Thereby, the measurements are rendered free of any bias error.

The reading out of data from the counter 58 to the register 60 is accomplished by means of the AND gates 47-48 and the OR gates 51-52 as follows. Upon agreement of a lag condition as denoted by the signals at the Q1 terminal of the flip flop 56 and the output terminal of the AND gate 46, the AND gate 47 provides a read signal which is coupled via the OR gate 52 to strobe the register 60 to read the contents of the counter 58 at terminal A thereof. Upon agreement of a lead condition as denoted by the Q2 terminal of the flip flop 56 and the output terminal of the AND gate 45, the AND gate 48 produces a read signal which is coupled via the OR gate 52 to strobe the register 60 to read the contents at terminal A. In the absence of agreement on the conditions of lead and lag, no read signal is initiated by the AND gates 47-48. The output signals of the AND gates 45-46 are also coupled via the OR gate S1 and through a delay unit 72 to terminal R of the counter 58 for resetting the counter 58, the delay of the delay unit 72 delaying the reset signal so that the resetting occurs after the reading out of data into the register 60. The counter 58 is reset even in the situation wherein no data is strobed into the register 60 during a condition of excessive noise. Thereby, any erroneous measurement of delay by the counter 58 is discarded.

Figure 4:
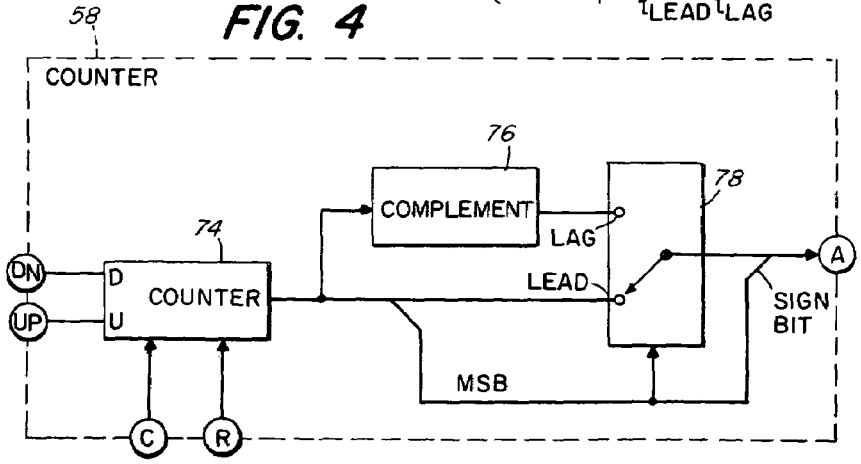
FIG. 4 is a block diagram of a counter of FIG. 1 showing a complementing circuit for designating positive and negative bearing angles of an incident sonar beam upon the transducer array of FIG. 1.

Referring now to FIG. 4, the counter 58 is seen to comprise a counter 74, a complementing circuit 76, and a switch 78. The counter 74 counts clock pulses appearing at terminal C and is reset by the reset signal at terminal R. The counter 74 counts up when activated by the logic 1 signal from the AND gate 44 of FIG. 1, this corresponding to a lead situation and to an acoustic wave having a bearing to the right of the array axis 68. The counter 74 counts down when activated by the logic 1 signal from the AND gate 43, this corresponding to a lag situation and to an acoustic wave having a bearing to the left of the array axis 68. When the counter 74 counts down below zero, the digits at the output of the counter 74 become logic 1's. These digits are coupled to the complementing circuit 76 which produces the complement of the digital number to indicate a negative count. The most significant bit, MSB, of the output signal of the counter 74 serves as a sign bit for indicating a positive or negative count of the counter 74. The sign bit signal also serves to operate the switch 78 so that the switch 78 couples a signal directly from the counter 74 to terminal A for positive values of count, and couples the signal of the complementing circuit 76 to terminal A for negative values of the count. In this way, the data coupled from terminal A to the register 60 of FIG. 1 includes a magnitude of the count as well as the sign of the count to indicate whether the bearings are to the right or left of the array axis 68.

Returning to FIG. 1, the data obtained over successive measurement intervals by the register 60 is accumulated by the accumulator 62 to provide a numerical value proportional to the average of several delay measurements. This averaging process provides greater accuracy to the measurement of delay. The digital signal representing the average value of delay is applied by the accumulator 62 as an address to the memory 64. The memory 64 provides bearing angle corresponding to the address; thus, the bearing angle is a function of the differential delay between the master and the slave signals. The resulting bearing angle is then applied by the memory 64 to the display 66 whereby the bearing deviation indication may be viewed.

The activation of the counter 58 to count up or down occurs only during the duration of the respective lead and lag signals provided by the AND gates 44 and 43. Accordingly, a short duration waveform, such as the waveform of graph #1 produces a relatively low count by the counter 58 while a relatively long duration of that waveform produces a relatively large count by the counter 58. In this way, the counter 58 produces a count which is directly proportional to the differential delay between the master signal and the slave signal. The temporal relationship of the trailing edges may also be utilized for the measurements of delay if desired, however, in this embodiment in this invention, the temporal relationship of the trailing edges of the master and of the slave signals is utilized only for a determination of the amount of distortion induced by noise for an acceptance or discarding of a delay measurement in accordance with the amount of distortion of the master and the slave signals induced by the noise.

Figure 5:
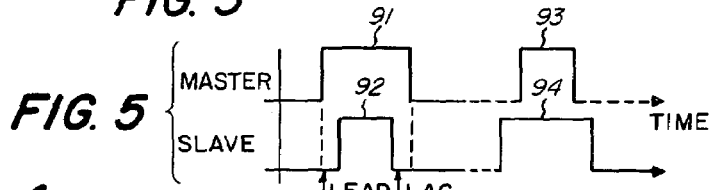
FIG. 5 shows a set of graphs depicting the effect of signal distortion from noise in channels of the measurement circuit of FIG. 1.

Referring also to FIG. 5, the graphs show a pulse of the signal in the master channel and a pulse of the signal in the slave channel in the situation wherein the noise power is sufficiently high relative to the signal power to cause significant distortion of the signal waveform. The effect of the distortion appears in the output signal of the limiter 36 of FIG. 2 for each channel of the measurement circuit 22, the distortion randomly altering the times of occurrence of the leading and trailing edges of the signal pulses as depicted in FIG. 5. In the exemplary set of signal pulses 91-92 of FIG. 5, the duration of the master signal pulse 91 is seen to be longer than the duration of the slave signal pulse 92. A lead situation exists with respect to the leading edges and a lag situation exists with respect to the trailing edges. In accordance with the foregoing explanation of the operation of the AND gates 47-48 and the OR gate 52, it is seen that under the circumstances depicted in FIG. 5 wherein a lead situation is converted to a lag situation, no strobe signal is applied by the OR gate 52 to the register 60 for reading out data of the counter 58. Similarly, in the exemplary set of pulses 93-94 wherein a lag situation of the leading edges is converted to a lead situation of the trailing edges, no strobe signal is applied by the OR gate 52 to the register 60. Thereby the bearing deviation indication appearing on the display 66 is rendered free of bias errors induced by the noise.

It is understood that the above-described embodiment of the invention is illustrative only and that modifications thereof may occur to those skilled in the art. Accordingly, it is desired that this invention is not to be limited to the embodiment disclosed therein but is to be limited only as defined by the appended claims.

What is claimed is:

1. A delay measurement circuit comprising:
   first and second channels for receiving first and second signals, each of said signals having a leading edge and a trailing edge;
   a leading edge circuit coupled to said first and said second channels for signaling the temporal relationship of the leading edges of said first and said second signals;
   a trailing edge circuit coupled to said first and said second channels for signaling the temporal relationship of the trailing edges of said first and said second signals;
   a memory coupled to said leading edge circuit for storing data of said leading edges;
   timing means activated by said leading edge circuit for measuring a delay between leading edges of said first and said second signals;
   gating means coupled to a register and said trailing edge circuit connected thereto for reading out data of said timing means when data stored in said memory conforms to a temporal relationship signaled by said trailing edge circuit and discards data which does not conform to said temporal relationship, transducer means connected to said first and second channels and adapted to receive said first and second signals, and counting means activated by said gating means to count in an up direction in response to a lead signal corresponding to a wave approaching from the right of the axis of said transducer means, and to count down in response to a lag signal corresponding to a wave approaching from the left of said axis of said transducer means.

2. A delay measurement circuit providing a differential delay measurement free of noise induced bias errors comprising:
   first and second channels for receiving first and second signals, each of said signals having a leading edge and a trailing edge;
   a leading edge circuit coupled to said first and second channels for signaling the temporal relationship of the leading edges of said first and said second signals;
   a trailing edge circuit coupled to said first and second channels for signaling the temporal relationship of the trailing edges of said first and second signals;
   means for measuring the differential delay between the leading edges of said first and second signals;
   means for comparing a temporal relationship of the trailing edges of said first and second signals with a temporal relationship of said leading edges of said first and second signals;
   means for discarding a measure of said measuring means when said temporal relationship of said trailing edges fails to conform with said temporal relationship of said leading edges; and
   gating means coupled to a memory and said trailing edge circuit for reading out data relating to said leading edges from said comparing means when the data conforms to a temporal relationship signaled by said trailing edge circuit.

3. A delay measurement circuit according to claim 2 further comprising a memory coupled to said delay measurement means for recording said temporal relationship between said leading edges to permit a subsequent comparison of said temporal relationship of said leading edges with said temporal relationship of said trailing edges and a discarding of a delay measurement of data not conforming within a predetermined signal period.

* * * * *

UNITED STATES PATENT AND TRADEMARK OFFICE
CERTIFICATE OF CORRECTION

PATENT NO. : 7,248,540 B1 Page 1 of 1
APPLICATION NO. : 05/944530
DATED : July 24, 2007
INVENTOR(S) : van Heyningen It is certified that error appears in the above-identified patent and that said Letters Patent is hereby corrected as shown below:

Title Page item (57) Abstract, line 9, delete "disgards" and replace with --disregards --.

Col. 5, line 30, delete "connection it" and replace with -- connection, it--.

Signed and Sealed this

Thirtieth Day of October, 2007

JON W. DUDAS
*Director of the United States Patent and Trademark Office*